(12) United States Patent
Osakabe

(10) Patent No.: US 7,414,935 B2
(45) Date of Patent: Aug. 19, 2008

(54) METHOD OF OVERWRITING OPTICAL DISK WITH ADAPTING INITIAL WRITING CONDITIONS

(75) Inventor: Katsuichi Osakabe, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 557 days.

(21) Appl. No.: 10/819,423

(22) Filed: Apr. 7, 2004

(65) Prior Publication Data
US 2004/0196762 A1 Oct. 7, 2004

(30) Foreign Application Priority Data
Apr. 7, 2003 (JP) ............... 2003-103014

(51) Int. Cl.
*G11B 7/00* (2006.01)
(52) U.S. Cl. ............... 369/47.51; 369/53.2; 369/53.31
(58) Field of Classification Search ........... None
See application file for complete search history.

(56) References Cited

U.S. PATENT DOCUMENTS

| | | | | |
|---|---|---|---|---|
| 6,091,685 | A * | 7/2000 | Kim ............... | 369/47.51 |
| 6,404,707 | B1 * | 6/2002 | Kaneda et al. ........ | 369/30.06 |
| 6,411,575 | B1 | 6/2002 | Akiyama et al. | |
| 6,434,096 | B1 * | 8/2002 | Akagi et al. ........ | 369/44.32 |
| 6,725,394 | B1 * | 4/2004 | Bolt ............... | 714/7 |
| 6,973,016 | B2 * | 12/2005 | Fukushima et al. ...... | 369/47.5 |
| 6,982,934 | B2 * | 1/2006 | Kanada ............ | 369/30.03 |
| 7,038,982 | B2 * | 5/2006 | Schreurs et al. ....... | 369/47.53 |
| 7,184,379 | B2 * | 2/2007 | Tsukihashi et al. ..... | 369/47.43 |
| 2003/0165101 | A1 * | 9/2003 | Komori ............ | 369/59.25 |

FOREIGN PATENT DOCUMENTS

| | | |
|---|---|---|
| JP | 11007645 | 1/1999 |
| JP | 11185383 | 7/1999 |
| JP | 2000231727 | 8/2000 |
| JP | 2000-293857 | 10/2000 |
| JP | 2002-358637 | 12/2002 |

OTHER PUBLICATIONS

Japanese Patent Office: Notice of Reasons for Rejection for Patent Application No. 2003-103014 (dated Mar. 12, 2007; 4 pgs.).
Japanese Patent Office: Decision of Rejection for Patent Application No. 2003-103014 (dated Jun. 1, 2007; 2 pgs.).

* cited by examiner

*Primary Examiner*—Wayne Young
*Assistant Examiner*—Adam Giesy
(74) *Attorney, Agent, or Firm*—Pillsbury Winthrop Shaw Pittman LLP

(57) ABSTRACT

An optical recording method is designed for recording data on a recordable optical disk by use of a laser beam of a present recording apparatus under a desired recording condition. The method detects identification information which is reserved in the optical disk and which is indicative of a type of a previous recording apparatus. The detected identification information is compared with a plurality of identification information which are previously stored in correspondence to various types of recording apparatuses. As results of the comparison, the method determines whether the detected identification information matches with one of the stored identification information which does not correspond to the type of the present recording apparatus. Upon the determining of matching, the method retrieves a recording condition which is previously stored in association with the matching identification information. The recording of the data is performed on the optical disk by the present recording apparatus with use of the retrieved recording condition.

17 Claims, 9 Drawing Sheets

$P2w < P0w < P1w$
P0w: OPTIMUM RECORDING POWER

RECORDING POWER P2w

RECORDING POWER P0w

RECORDING POWER P1w

FIG.5 (A)
SPOT SHAPE     PIT TO BE FORMED
 
FIG.5 (B)
 
FIG.5 (C)
 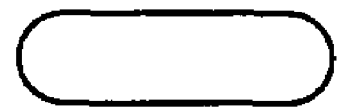
FIG.5 (D)
 

METHOD OF OVERWRITING OPTICAL DISK WITH ADAPTING INITIAL WRITING CONDITIONS

BACKGROUND OF THE INVENTION

1. Technical Field of the Invention

The present invention relates to a recordable optical disk recording method and a recordable optical disk apparatus to record new data on a recordable optical disk of rewritable type by adjusting recording conditions based on original recording conditions of another recording apparatus which has recorded old data on the optical disk.

2. Prior Art

Recordable optical disks are available as write-once-read-many optical disks such as CD-R, DVD-R, DVD+R and as rewritable optical disks such as CD-RW, DVD-RW, DVD+RW, and DVD-RAM. Recording characteristics vary with manufacturers and even recordable optical disk types of the same manufacturer. When recording data on a recordable optical disk, the optical disk recording apparatus normally detects identification information (disk ID) recorded on the optical disk. The optical disk recording apparatus performs OPC (optimum power control) to determine an optimum write power for the object disk. The optical disk recording apparatus adjusts the recording conditions for attaining optimal recording quality, and then writes data by the determined optimal write power of the laser beam (e.g., see patent document 1).

Patent document 1 is Japan Patent Application Laid-Open No. 11-7645 (pp. 5-7, FIGS. 5 and 6).

However, the optical disk apparatus described in Patent document 1 may degrade jitter characteristics of reproduced data and may increase an error rate of the reproduced data in case that the optical disk apparatus overwrite the data on a recordable optical disk on which another optical disk apparatus has already recorded old data.

Generally, optical disk recording apparatuses use different recording conditions depending on manufacturers and models of the apparatuses. Nonetheless, the conventional optical disk apparatus described in Patent document 1 only memorizes its own recorder identification information in correspondence to disk identification information which identifies types or models of recordable optical disks. Therefore, when a second optical disk recording apparatus overwrites data on a recordable optical disk on which a first optical disk recording apparatus has recorded data, the OPC is indispensable for finding an optimum write power value for the second optical disk recording apparatus. Even if the data is recorded after finding the optimum power value based on the OPC, however, the recording condition of the second optical disk recording apparatus differs from that of the first optical disk recording apparatus that recorded the original data. Consequently, the original data may not be completely erased by the second optical disk recording apparatus prior to the writing of new data over the original data.

Generally, the optical disk recording apparatus tunes the write power and erase power of the laser beam to form pits with the same width (shape) and to completely erase the original data during overwriting. However, when the recording rate of data varies, the formed pits may have different widths (shapes) due to deviations in the laser diode or rewritable optical disk materials. When overwriting data by forming a new pit, the new pit may not be able to completely erase a previously formed pit due to such difference of the pit width. When data is recorded at 4× speed on the rewritable optical disk, for example, overwriting pit formed at 1× speed cannot completely erase the old pit recorded at 4× speed on the same rewritable optical disk. This may degrade jitter characteristics of the data reproduction and increase the error rate.

The conventional optical disk recording apparatus uses different recording conditions such as the write power, the erase power, the bottom power, the write strategy, and the spot shape depending on manufacturers, models, firmware versions, and recording rates. Further, the rewritable optical disk is subject to different recording characteristics depending on recording conditions. When a first optical disk recording apparatus is used to record data on the rewritable optical disk, overwriting data using a second optical disk recording apparatus degrades jitter characteristics and increases the error rate. This is because a previous pit formed by the first recording apparatus on the rewritable optical disk cannot be erased completely by the second recording apparatus. Stated otherwise, a new pit cannot be formed by the second recording apparatus so as to completely cover the original pit formed by the first recording apparatus.

SUMMARY OF THE INVENTION

It is therefore an object of the present invention to provide a recordable optical disk recording method and a recordable optical disk recording apparatus capable of obtaining data without degrading jitter characteristics and without increasing an error rate even if a first optical disk recording apparatus has record data on a rewritable optical disk and a second optical disk recording apparatus overwrites data on the same rewritable optical disk.

In order to solve the above-mentioned problem, the present invention has the following constitutions.

The inventive method is designed for recording data on a recordable optical disk by use of a laser beam of a present recording apparatus under a desired recording condition. The inventive method comprises the steps of detecting identification information which is reserved in the optical disk for identifying a type of a recording apparatus which previously recorded the optical disk, comparing the detected identification information with a plurality of identification information which are previously stored in correspondence to various types of recording apparatuses, determining, as results of the comparing, whether the detected identification information matches with one of the stored identification information which does not correspond to the type of the present recording apparatus, retrieving, upon the determining of matching, a recording condition which is previously stored in association with the matching identification information, and performing the recording of the data on the optical disk by the present recording apparatus with use of the retrieved recording condition.

A conventional optical disk recording apparatus overwrites data by adjusting a recording condition so as to obtain optimum recording quality. However, the recording condition does not necessarily ensure to completely erase data recorded by another optical disk recording apparatus. Overwriting further data may incompletely erase the original data, thus degrading jitter characteristics and increasing an error rate. The constitution according to the present invention reads the recorder identification information such as a manufacturer and a model of a previous optical disk recording apparatus that has recorded the original data on a rewritable optical disk before rewriting data. When there is a match between the recorder identification information detected from the optical disk and prestored recorder identification information of some type of recording apparatus, data is recorded under a recording condition associated with the matching identification information. Therefore, the present invention can completely erase the original data by overwriting new data under the same condition as that for the previous optical disk recording apparatus that has recorded the original data, for example. It is possible to overwrite data with an optimum recording state without degrading jitter characteristics.

Further, the inventive method is designed for recording new data with use of a present recording apparatus under a desired recording condition by irradiating a laser beam on a recordable optical disk which has been recorded with old data by a previous recording apparatus. The inventive method comprises the steps of detecting identification information which is reserved in the optical disk for identifying at least a manufacturer or model type of the previous recording apparatus, comparing the detected identification information with a plurality of identification information which are previously stored in correspondence to the present recording apparatus and other recording apparatuses, determining as results of the comparing whether the detected identification information matches with one of the stored identification information which does not correspond to the present recording apparatus, retrieving upon the determining of matching a recording condition which is previously stored in association with the matching identification information, and performing the recording of the new data on the optical disk by the present recording apparatus with use of the retrieved recording condition which indicates either directly a power of the laser beam or a strategy of irradiating the laser beam, the power indicating at least one of an erase power for erasing the old data from the optical disk, a write power for recording the new data on the optical disk and a bottom power of the laser beam.

This constitution records new data by changing at least one of the write power, the erase power, and the bottom power according to the identification information of the previous optical disk recording apparatus. Otherwise, this constitution records new data by changing the write strategy of the laser beam. Accordingly, it is possible to further fine-tune recording conditions for data to be overwritten. The old data can be erased completely. It is possible to decrease an error rate of the new data.

Further, the inventive method is designed for recording new data with use of a present recording apparatus under a desired recording condition by irradiating a laser beam on a recordable optical disk of a rewritable type which has been recorded with old data by a previous recording apparatus. The inventive method comprises the steps of detecting identification information which is reserved in the optical disk for identifying at least a manufacturer or model type of the previous recording apparatus which previously recorded the optical disk, comparing the detected identification information with a plurality of identification information which are previously stored in correspondence to the present recording apparatus and other recording apparatuses, determining as results of the comparing whether the detected identification information matches with one of the stored identification information which does not correspond to the present recording apparatus, retrieving upon the determining of matching a recording condition which is previously stored in association with the matching identification information, and performing the recording of the new data on the optical disk by the present recording apparatus with use of both the retrieved recording condition and a current recording condition set for the present recording apparatus such that the retrieved recording condition is used to control an erase power of the laser beam for erasing the old data from the optical disk while the current recording condition is used to optimize a write power of the laser beam for recording the new data over the erased old data.

This constitution detects the previous recorder identification information from the rewritable optical disk. Based on this information, the present optical disk recording apparatus can irradiate a laser beam with an erase power capable of completely erasing the original data. In addition, the original data can be completely erased while writing the new data by irradiating an optimum write power onto the optical disk. The recording condition need not be changed to conform to other optical disk recording apparatuses. Data can be recorded on the rewritable optical disk under the recording condition specified for the current optical disk recording apparatus. Therefore, it is unnecessary to change the recording condition such as increasing the write power in accordance with the original data. Consequently, it is possible to prolong the life of the laser diode and the rewritable optical disk. When performing a subsequent overwrite operation, the present optical disk recording apparatus can overwrite data under its own recording condition without changing the erase power or the write power.

Preferably, the step of detecting further detects rate information which indicates a rate of recording the old data on the optical disk by the previous recording apparatus, and the step of performing erases the old data in conformity with the detected rate information prior to the recording of the new data.

The recording condition of the optical disk recording apparatus may vary with the rate or speed to record data. Retrieving the rate information makes it possible to more accurately grasp the recording condition used by the previous optical disk recording apparatus that has recorded the original data. Consequently, it becomes possible to further fine-tune recording conditions of new data to overwrite. The original data can be completely erased while overwriting the new data.

Further, the inventive method is designed for recording data by use of a recording apparatus with a desired recording condition on a recordable optical disk which has been recorded with data by anther recording apparatus which is installed with one version of a recording control program for controlling the recording of the data. The inventive method comprises the steps of detecting version information which is reserved in the optical disk for identifying the version of the recording control program installed in said another recording apparatus which previously recorded the optical disk, comparing the detected version information with a plurality of version information which are previously stored in correspondence to different versions of the recording control program, determining as results of the comparing whether the detected version information matches with one of the stored version information, retrieving upon the determining of matching a recording condition which is previously stored in association with the matching version information, and performing the recording of the data on the optical disk by the recording apparatus with use of the retrieved recording condition.

The recording condition of the optical disk recording apparatus may vary with versions of a recording control program (firmware) for the optical disk recording apparatus. Retrieving the version information makes it possible to more accurately grasp the previous recording condition of the optical disk recording apparatus that has recorded the original data. Consequently, it is possible to further fine-tune current recording conditions of new data to overwrite based on the retrieved version information of the recording control program. The original data can be reliably erased while overwriting the new data.

Further, the inventive method is designed for performing a session of recording new data with use of a recording apparatus under a desired recording condition by irradiating a laser beam onto a recordable optical disk which has a filled track recorded with old data by another recording apparatus and a vacant track recorded with no data. The inventive method comprises the steps of discriminating whether the session is an initial writing session for recording the new data into the vacant track or an overwriting session for recording the new data over the filled track, and performing either of the initial writing session or the overwriting session based on results of the step of discriminating. The initial writing session is performed by the steps of conducting OPC operation to determine an optimal write power of the laser beam, and using the determined optimal write power of the laser beam to record the new data onto the vacant track. The overwriting session is performed by the steps of detecting identification information which is reserved in the optical disk for identifying at least a manufacturer or a model type of said another recording apparatus which previously recorded the optical disk, comparing the detected identification information with a plurality of identification information which are previously stored in correspondence to various types of recording apparatuses so as to determine if the detected identification information matches with one of the stored identification information, retrieving a recording condition which is previously stored in association with the matching identification information, performing the recording of the new data into the filled track of the optical disk by the recording apparatus with use of the retrieved recording condition which indicates at least one of an erase power for erasing the old data from the filled track, a write power for writing the new data over the erased old data and a bottom power of the laser beam, otherwise conducting OPC operation to determine an optimal write power of the laser beam when the detected identification information does not match with any one of the stored identification information, and performing the recording of the new data into the filled track by the recording apparatus with use of the determined optimal write power of the laser beam.

According to this constitution, it is determined whether data is written initially or is overwritten on a recordable optical disk. Data is recorded dependent on the determined recording state. Generally, data can be recorded on the optical disk with an optimum recording condition. Recording conditions depend on the types of optical disk recording apparatuses. On the same recording apparatus, the recording conditions show almost the same tendency irrespectively of optical disk types. When there is a match with the recorder identification information stored on the optical disk, the present invention overwrites data on the optical disk using at least one of the write power, the erase power, and the bottom power associated with the matching recorder identification information. Thus, data can be overwritten with an optimum recording condition.

Further, the inventive method is designed for performing a session of recording new data with use of a recording apparatus under a desired recording condition by irradiating a laser beam onto a recordable optical disk which has a filled track recorded with old data by another recording apparatus and a vacant track recorded with no data. The inventive method comprises the steps of discriminating whether the session is an initial writing session for recording the new data into the vacant track or an overwriting session for recording the new data over the filled track, and performing either of the initial writing session or the overwriting session based on results of the step of discriminating. The initial writing session is performed by the steps of conducting OPC operation to determine an optimal write power of the laser beam, and using the determined optimal write power of the laser beam to record the new data onto the vacant track. The overwriting session is performed by the steps of detecting identification information which is reserved in the optical disk for identifying at least a manufacturer or a model type of said another recording apparatus which previously recorded the optical disk which previously recorded the optical disk, comparing the detected identification information with a plurality of identification information which are previously stored in correspondence to various types of recording apparatuses so as to determine if the detected identification information matches with one of the stored identification information, retrieving a recording condition which is previously stored in association with the matching identification information, performing the recording of the new data into the filled track of the optical disk by the recording apparatus with use of the retrieved recording condition which indicates either a power of the laser beam or a strategy of irradiating the laser beam, the power indicating at least one of an erase power for erasing the old data from the filled track, a write power for recording the new data over the erased old data and a bottom power of the laser beam, otherwise conducting OPC operation to determine an optimal write power of the laser beam when the detected identification information does not match with any one of the stored identification information, and performing the recording of the new data into the filled track by the recording apparatus with use of the determined optimal write power of the laser beam.

According to this constitution, it is determined whether data is written initially or is overwritten on a recordable optical disk. The data is recorded according to this recording state. The data can be recorded on the optical disk with an optimum recording condition in either case of initial writing session or overwriting session.

Further, the inventive method is designed for performing a session of recording new data with use of a recording apparatus under a desired recording condition by irradiating a laser beam onto a recordable optical disk which has a filled track recorded with old data by another recording apparatus and a vacant track recorded with no data. The inventive method comprises the steps of discriminating whether the session is an initial writing session for recording the new data into the vacant track or an overwriting session for recording the new data over the filled track, and performing either of the initial writing session or the overwriting session based on results of the step of discriminating. The initial writing session is performed by the steps of conducting OPC operation to determine an optimal write power of the laser beam, and using the determined optimal write power of the laser beam to record the new data onto the vacant track. The overwriting session is performed by the steps of conducting OPC operation to determine an optimal write power of the laser beam, detecting identification information which is reserved in the optical disk for identifying at least a manufacturer or a model type of said another recording apparatus which previously recorded the optical disk comparing the detected identification information with a plurality of identification information which are previously stored in correspondence to various types of recording apparatuses so as to determine if the detected identification information matches with one of the stored identification information, retrieving, upon the matching, correction information which is previously stored in association with the matching identification information, correcting the determined optimal write power of the laser beam according to the retrieved correction information, and using the corrected optimal write power of the laser beam to record the new data onto the filled track. Preferably, the method further comprises the steps of determining an erase power of the laser beam based on the determined optimal write power, correcting the determined erase power of the laser beam according to the retrieved correction information, and using the corrected erase power of the laser beam for erasing the old data from the filled track to record the new data onto the filled track.

When data is overwritten according to this constitution, the OPC is performed to determine an optimum write power, and then detect recorder identification information. The write power and the erase power are corrected based on the correction information prestored in association with the detected recorder identification information. Accordingly, new data can be overwritten after reliably erasing old data already recorded on the optical disk.

Further, the inventive optical recording apparatus is provided for recording data on a recordable optical disk under a desired recording condition. The inventive apparatus comprises a detecting section that detects identification information which is reserved in the optical disk for identifying a type of another optical recording apparatus, a storage section that stores a plurality of identification information in correspondence to various types of other optical recording apparatuses, and stores a plurality of recording conditions in association with the plurality of the identification information, respectively, a comparing section that compares the detected identification information with the plurality of the stored identification information so as to determine whether the detected identification information matches with one of the stored identification information, and a recording section that operates upon the determining of matching for retrieving a recording condition associated with the matching identification information, and that performs the recording of the data on the optical disk with use of the retrieved recording condition. This constitution can provide the same effect as the inventive recording methods as mentioned above.

Preferably, the detecting section further detects additional information including at least one of program version information, disk identification information and recording rate information from the optical disk of a rewritable type which has been recorded with old data by another optical recording apparatus installed with a control program for recording the old data, the program version information indicating the version of the installed control program, the disk identification information identifying the optical disk, the recording rate information indicating a recording rate of the old data, and wherein the recording section performs the recording of the data so as to write the data over the old data in conformity with the detected additional information. This constitution can provide the same effects as the inventive recording methods as mentioned above.

BRIEF DESCRIPTION OF THE DRAWINGS

FIGS. 5(A), 5(B), 5(C) and 5(D) show spot shapes of the laser beam irradiated from the optical disk recording apparatus and pit shapes formed on the rewritable optical disk.

DETAILED DESCRIPTION OF THE INVENTION

Figure 1:
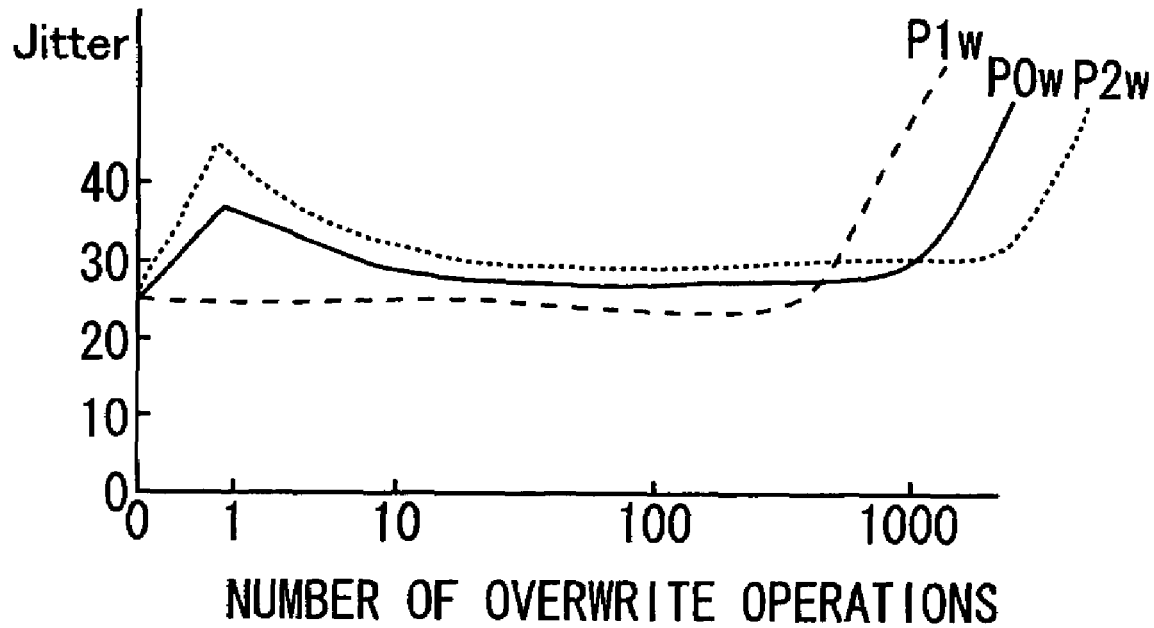
FIGS. 1(A) and 1(B) are graphs showing relationship between the number of overwrite operations and jitter on a rewritable optical disk and changes of jitter when the optical disk is overwritten with different write powers.
Figure 1:
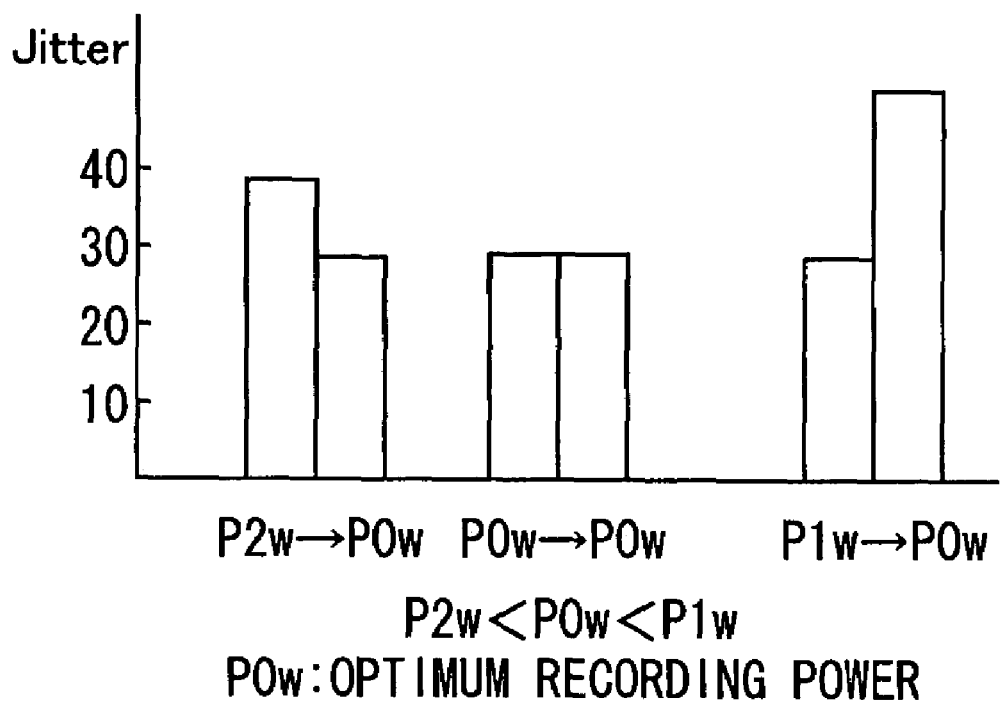

First, general concept of the invention is presented below before detailed description of embodiments of the invention. Generally, the optical disk recording apparatus has diverse recording characteristics since different manufacturers and models use different settings for write power, erase power, and bottom power of a laser beam irradiated on rewritable optical disks. FIG. 1(A) is a graph showing relationship between the number of overwrite operations and jitter on a rewritable optical disk. FIG. 1(B) shows changes of jitter when the optical disk is overwritten with different write powers. FIG. 1(A) illustrates successive overwrite operations with different write powers on the rewritable optical disk of the same type. The write powers are adjusted to $P2w<P0w<P1w$, where $P0w$ is an optimum write power.

The rewritable optical disk reveals different values in terms of the jitter and the number of allowable overwrite operations depending on write powers of the irradiated laser beam. FIG. 1(A) shows that optimum write power $P0w$ is used for recording on the rewritable optical disk. In this case, the first overwrite operation shows high jitter. As the number of overwrite operations increases, the jitter decreases gradually. Approximately ten overwrite operations stabilize the jitter in the subsequent overwrite operations. The jitter suddenly increases over 1000 overwrite operations. When the optimum write power $P0w$ is used for recording on the rewritable optical disk, a user can perform 1000 overwrite operations, i.e., the number of rewritable operations specified in the Orange Book Part 3.

Write power $P1w$ is higher than optimum write power $P0w$ for recording on the rewritable optical disk. Using write power $P1w$ stabilizes and does not increase the jitter even if the number of overwrite operations is small. Write power $P1w$ always lowers the jitter compared to the optimum write power $P0w$. However, write power $P1w$ soon degrades the optical disk. The jitter suddenly increases before 1000 overwrite operations. Recording on the rewritable optical disk with write power $P1w$ shortens the life of the rewritable optical disk. Therefore, the user can just perform much less than 1000 overwrite operations.

On the other hand, write power $P2w$ is lower than optimum write power $P0w$. Write power $P2w$ indicates the characteristic similar to that of optimum write power $P0w$, but always produces jitter values higher than those for optimum write power $P0w$. In this case, the optical disk degrades slowly. The jitter increases over 1000 overwrite operations. Recording on the rewritable optical disk with write power $P2w$ extends the life of the rewritable optical disk. Therefore, the user can perform much more than 1000 overwrite operations.

The rewritable optical disk is subject to a change in the jitter when data is recorded on the rewritable optical disk with a given write power, and then data is overwritten with a different write power. Let us assume the relationship of $P2w<P0w<P1w$ between the write powers of the laser beam irradiated to the optical disk. In this case, the jitter decreases when data is recorded on the rewritable optical disk with write power $P2w$, and then data is overwritten with write power $P0w$ ($>P2w$) as shown in FIG. 1(B). The jitter does not change when data is recorded on the rewritable optical disk with write power $P0w$, and then data is overwritten with the same write power $P0w$. The jitter increases when data is recorded on the rewritable optical disk with write power $P1w$, and then data is overwritten with write power $P0w$ ($<P1w$).

Figure 2:
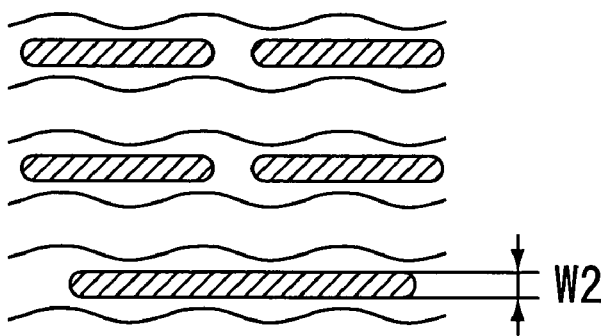
FIGS. 2(A), 2(B) and 2(C) show shapes of pits formed on the rewritable optical disk.
Figure 2:
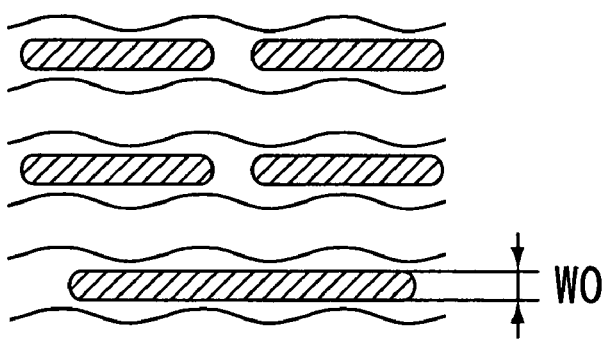
Figure 2:
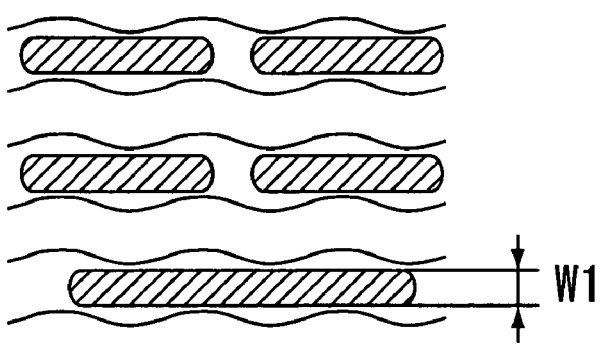

When a same spot shape of the laser beam is irradiated onto the rewritable optical disk, increasing the write power widens a pit to be formed. FIGS. 2(A), 2(B) and 2(C) show shapes of pits formed on the rewritable optical disk. When there is the relationship of $P2w<P0w<P1w$ between the write powers of the laser beam irradiated onto the optical disk, for example, increasing the write powers widens pits as shown in FIGS. 2(A), 2(B) and 2(C). The pit widths are subject to the relationship of $W2<W0<W1$. When there is the relationship of $P2e<P0e<P1e$ between the erase powers of the laser beam irradiated onto the optical disk, increasing the erase powers widens an erase range.

When a pit is formed by irradiating the laser beam with write power $P2w$ according to the example in FIG. 2(A), the pit can be completely erased with the laser beam's erase power $P2e$ or higher. That is to say, the pit can be erased with the erase power $P2e$, $P0e$, or $P1e$. When a pit is formed by irradiating the laser beam with write power $P0w$ as shown in FIG. 2(B), the pit can be completely erased with the laser beam's erase power $P0e$ or higher. That is to say, the pit can be erased with the erase power $P0e$ or $P1e$. Erase power $P2e$ cannot completely erase the pit and leaves edges unerased. When a pit is formed by irradiating the laser beam with write power $P1w$ as shown in FIG. 2(C), the pit can be completely erased with the laser beam's erase power $P1e$ or higher. That is to say, the pit can be erased with the erase power $P1e$. Erase power $P2e$ or $P0e$ cannot completely erase the pit and leaves edges unerased.

Figure 3:
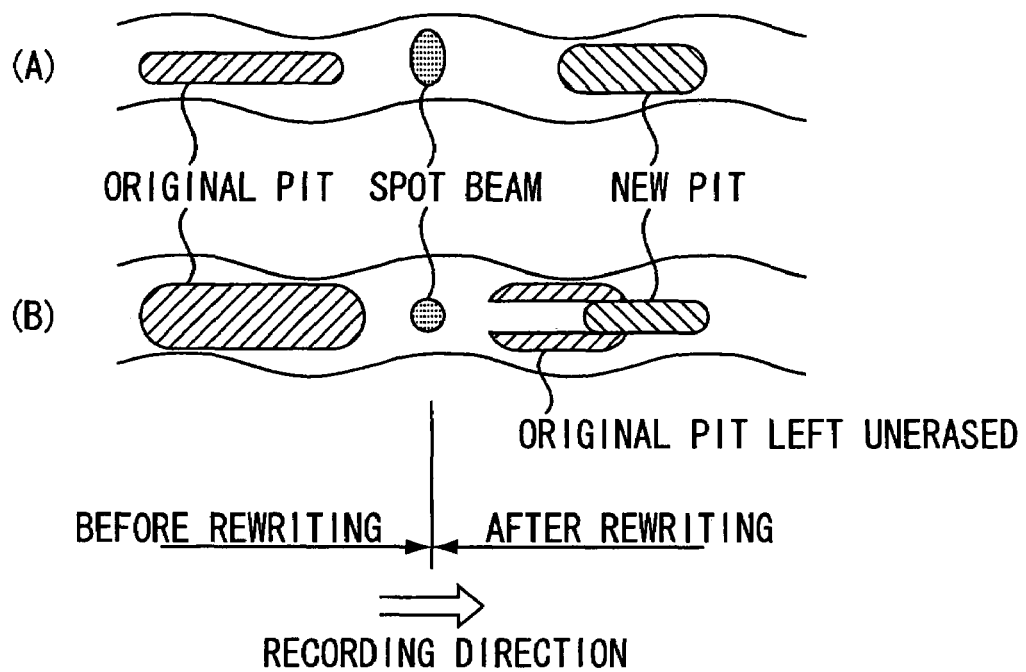
FIG. 3 schematically shows overwriting on the rewritable optical disk.

Accordingly, the following phenomenon occurs when data is overwritten on the rewritable optical disk by a recordable optical disk recording apparatus different from the optical disk recording apparatus that has recorded the original data. FIG. 3 schematically shows overwriting on the rewritable optical disk. Part (A) of FIG. 3 shows that data is recorded with write power $P2w$ on the rewritable optical disk, and then the laser beam is irradiated with erase power $P0e$ and write power $P0w$ ($>P2w$) for overwriting. The laser beam with irradiation power $P0e$ completely erases the original pit formed by irradiating the laser beam with write power $P2w$. Any pit formed by write power $P2w$ does not remain. Further, forming pits by irradiating the laser beam with write power $P0w$ improves the jitter and decreases the error rate. This is because irradiating the laser beam with write power $P0w$ decreases the jitter as shown in FIG. 1(B).

Part (B) of FIG. 3 shows that data is recorded with write power $P1w$ on the rewritable optical disk, and then the laser beam is irradiated with erase power $P0e$ and write power $P0w$ ($<P1w$) for overwriting. Irradiating the laser beam with erase power $P0e$ generates a narrow erase range. Consequently, erase power $P0e$ cannot completely erase the original pit formed by irradiating the laser beam with write power $P1w$, leaving the pit edges unerased. A pit formed by irradiating the laser beam with write power $P0w$ is narrower than a pit formed by irradiating the laser beam with write power $P1w$. The original pit's edges may overlap with the newly formed pit. This degrades jitter characteristics and increases the error rate.

Figure 4:
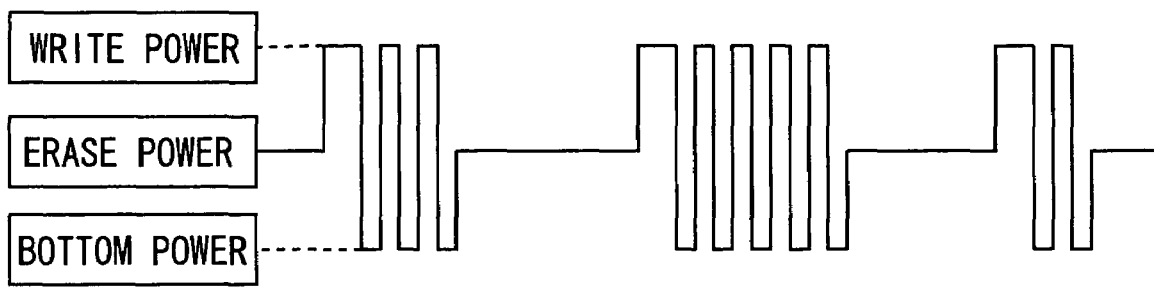
FIG. 4 shows an example of write strategies for rewritable optical disks.

The optical disk recording apparatus uses different write strategy settings depending on manufacturers and models. FIG. 4 shows an example of write strategies for rewritable optical disks. Generally, the write strategy is specified for the laser power control of rewritable optical disks. When the firmware version is modified, all or part of the write power Pw, erase power Pe, and the bottom power Pb may be also modified. In case of overwriting data by a new version of the firmware on tracks where old data has been recorded by a previous version of the firmware, all or some of the write power Pw, erase power Pe, and the bottom power Pb may be modified to improve the recording quality.

Manufacturers of optical disk recording apparatuses use different spot shapes for the laser beam irradiated onto optical disks from optical disk recording apparatuses. FIGS. 5(A), 5(B), 5(C) and 5(D) show spot shapes of the laser beam irradiated from the optical disk recording apparatus and pit shapes formed on the rewritable optical disk. When the rewritable optical disk is a CD-RW in FIGS. 5(A), 5(B), 5(C) and 5(D), the optical disk recording apparatus generates different spot shapes depending on manufacturers as follows. Manufacturer A uses a vertically long elliptical spot; manufacturer B a horizontally long elliptical spot; and manufacturer C a slantwise long elliptical spot. When the rewritable optical disk is a DVD-RW, DVD+RW, or DVD-RAM, the optical disk recording apparatus generates a vertically, horizontally, or slantwise long elliptical spot, or generates a circular spot.

Since the laser beam generates different spot shapes as mentioned above, the manufacturers of optical disk recording apparatuses use different shapes (widths) of pits formed on rewritable optical disks as shown in FIGS. 5(A), 5(B), 5(C) and 5(D). Let us consider that a certain manufacturer's optical disk recording apparatus is used to record data on a rewritable optical disk, and then another manufacturer's optical disk recording apparatus is used to overwrite data on the same rewritable optical disk. Even if the write power and the erase power are each set to the identical values, the same phenomenon as described with reference to FIG. 3(B) occurs. That is to say, data is recorded on a rewritable optical disk D by irradiating the laser beam having a spot shape as shown in FIG. 5(A). Data is then overwritten by irradiating the laser beam having a spot shape as shown in FIG. 5(B). In this case, edges of the original pit remain unerased, thus degrading jitter characteristics and increasing the error rate. As another example, data is recorded on the rewritable optical disk D by irradiating the laser beam having the spot shape as shown in FIG. 5(B). Data is then overwritten by irradiating the laser beam having the spot shape as shown in FIG. 5(A). In this case, the original pit is completely erased, thus improving jitter characteristics and decreasing the error rate.

Generally, the optical disk recording apparatus tunes the write power and erase power of the laser beam to form pits with the same width (shape) and to completely erase the original data during overwriting. However, when the recording rate of data varies, the formed pits may have different widths (shapes) due to deviations in the laser diode or rewritable optical disk materials. When overwriting data to form a new pit, the new pit may not be able to completely erase a previously formed pit due to such difference of the pit width. When data is recorded at 4× speed on the rewritable optical disk, for example, overwriting pit formed at 1× speed cannot completely erase the old pit recorded at 4× speed on the same rewritable optical disk. This may degrade jitter characteristics of the data reproduction and increase the error rate.

The optical disk recording apparatus uses different recording conditions such as the write power, the erase power, the bottom power, the write strategy, and the spot shape depending on manufacturers, models, firmware versions, and recording rates. Further, the rewritable optical disk is subject to different recording characteristics depending on recording conditions. When a first optical disk recording apparatus is used to record data on the rewritable optical disk, overwriting data using a second optical disk recording apparatus degrades jitter characteristics and increases the error rate. This is because a previous pit formed by the first recording apparatus on the rewritable optical disk cannot be erased completely by the second recording apparatus. Stated otherwise, a new pit cannot be formed by the second recording apparatus so as to completely cover the original pit formed by the first recording apparatus.

An overview of the present invention will now be described. According to the present invention, a storage section of the optical disk recording apparatus prestores RID (Recorder Identification) codes about a plurality of optical disk recording apparatuses. The RID code can be used to identify manufacturers, models, firmware versions, recording speed and other optical disk information associated to a recordable optical disk recording apparatus that is used to record data. Each RID code is stored in association with recording conditions of each optical disk recording apparatus such as the laser's write power, erase power, bottom power, and write strategy. When overwriting data on a rewritable optical disk, the optical disk recording apparatus detects the RID code from the rewritable optical disk. The detected RID code is collated with previously stored RID codes of various types of optical disk recording apparatuses. When the detected RID code matches with one of the other RID codes than its own prestored RID code, the optical disk recording apparatus changes the recording condition according to that associated to the matching RID, and then overwrites data. For example, the present optical disk recording apparatus changes the recording condition to that similar to the recording condition of previous optical disk recording apparatus that has recorded the original data, and then overwrites data. This makes it possible to completely erase the original data when overwriting data with the optical disk recording apparatus different from the one that has recorded the original data. Accordingly, it is possible to prevent jitter characteristics from degrading and to decrease the error rate.

Figure 6:
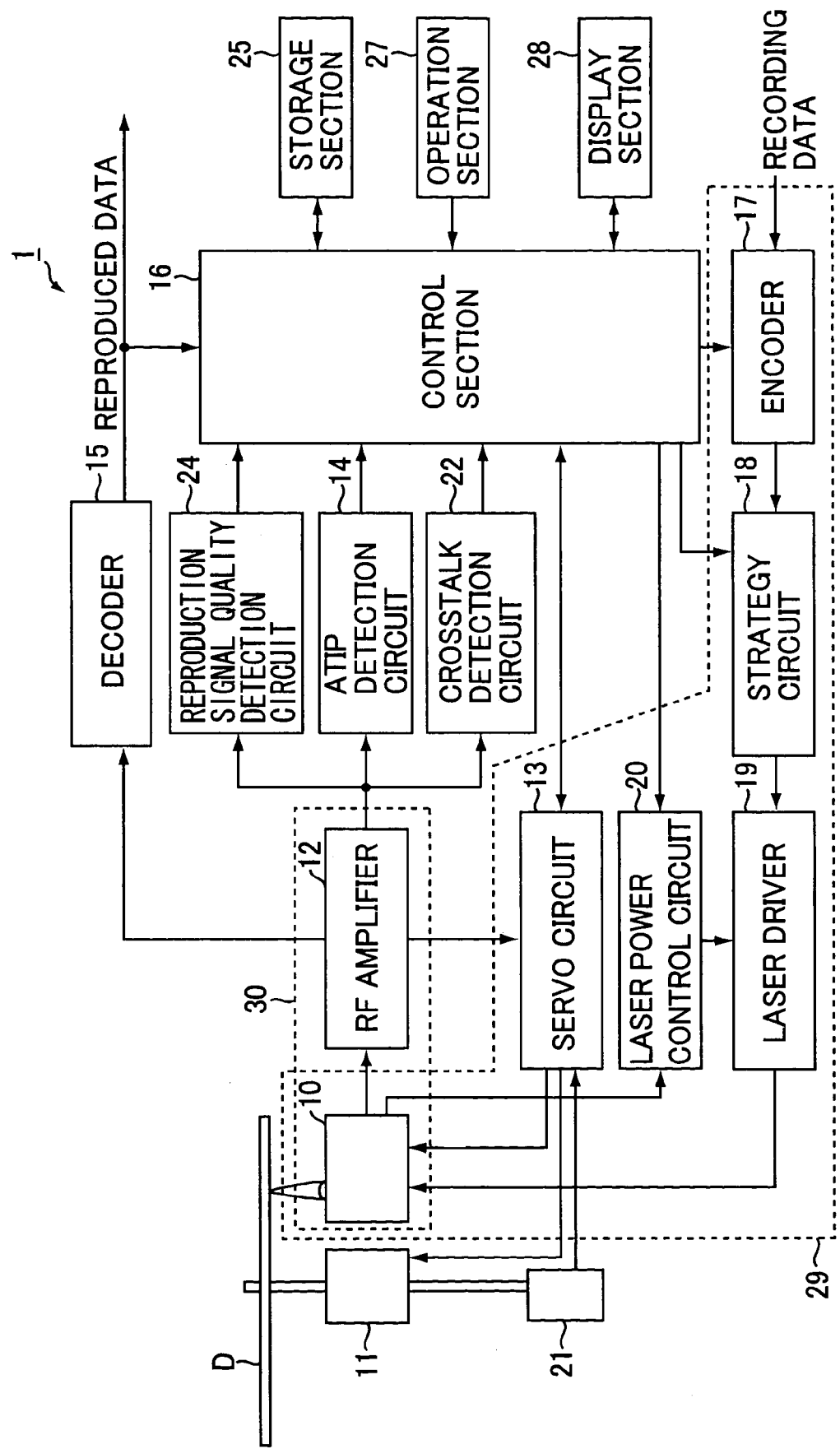
FIG. 6 is a block diagram showing a configuration of the optical disk recording apparatus according to the embodiment of the present invention.

The following describes in detail the optical disk recording apparatus according to the embodiment of the present invention. FIG. 6 is a block diagram showing a configuration of the optical disk recording apparatus according to the embodiment of the present invention. The configuration according to the embodiment uses a laser beam as a light beam to be irradiated on optical disks. As shown in FIG. 6, a recordable optical disk recording apparatus 1 comprises an optical pickup 10, a spindle motor 11, an RF amplifier 12, a servo circuit 13, an ATIP detection circuit 14, a decoder 15, a control section 16, an encoder 17, a strategy circuit 18, a laser driver 19, a laser power control circuit 20, a frequency generator 21, a crosstalk detection circuit 22, a reproduction signal quality detection circuit 24, a storage section 25, an operation section 27, and a display section 28. As data recording means, a recording section 29 comprises the optical pickup 10, the servo circuit 13, the encoder 17, the strategy circuit 18, the laser driver 19, and the laser power control circuit 20. As data reproduction means, a reproduction section 30 comprises the optical pickup 10 and the RF amplifier 12.

The spindle motor 11 drives a recordable optical disk D where data is to be recorded. The spindle motor has a rotating shaft. Its end is provided with a recordable optical disk support mechanism (not shown) comprising a turntable and the like to hold (chuck) a recordable optical disk.

The optical pickup 10 comprises: an optical system including a laser diode, a lens, a mirror, and the like; a return light (reflected light) receiving element; and a focus servo mechanism. During recording and reproduction, the optical pickup 10 irradiates the laser beam onto the optical disk D and receives return light from the optical disk D. The received signal is an EFM modulated RF signal. Here, EFM means Eight to Fourteen Modulation. The optical pickup 10 outputs the RF signal to the RF amplifier 12. The focus servo mechanism maintains a constant distance between the lens of the optical pickup 10 and the optical disk's data surface. The optical pickup 10 has a monitor diode. The return light from the optical disk D causes a current in the monitor diode. This current is supplied to the laser power control circuit 20.

The frequency generator 21 detects an angle of rotation and the number of revolutions output from the spindle motor 11, and outputs associated signals to the servo circuit 13.

The RF amplifier 12 amplifies the EFM modulated RF signal supplied from the optical pickup 10. The amplified RF signal is output to the servo circuit 13, the ATIP detection circuit 14, the crosstalk detection circuit 22, the reproduction signal quality detection circuit 24 for measuring reproduction signal quality, and the decoder 15.

During reproduction, the decoder 15 EFM-demodulates the EFM-modulated RF signal supplied from the RF amplifier 12 to generate reproduction data. This reproduction data is output to the storage section 25. During recording, the decoder 15 EFM-demodulates the RF signal supplied from the RF amplifier 12 to reproduce an area recorded by test recording.

Before actual recording of data, the optical disk recording apparatus 1 according to the embodiment performs test recording on the PCA (Power Calibration Area) area along an inside periphery of the optical disk D. Based on a reproduction result on the test-recorded area, the optical disk recording apparatus 1 is configured to find a recording condition for optimum recording on the optical disk D.

Figure 7:
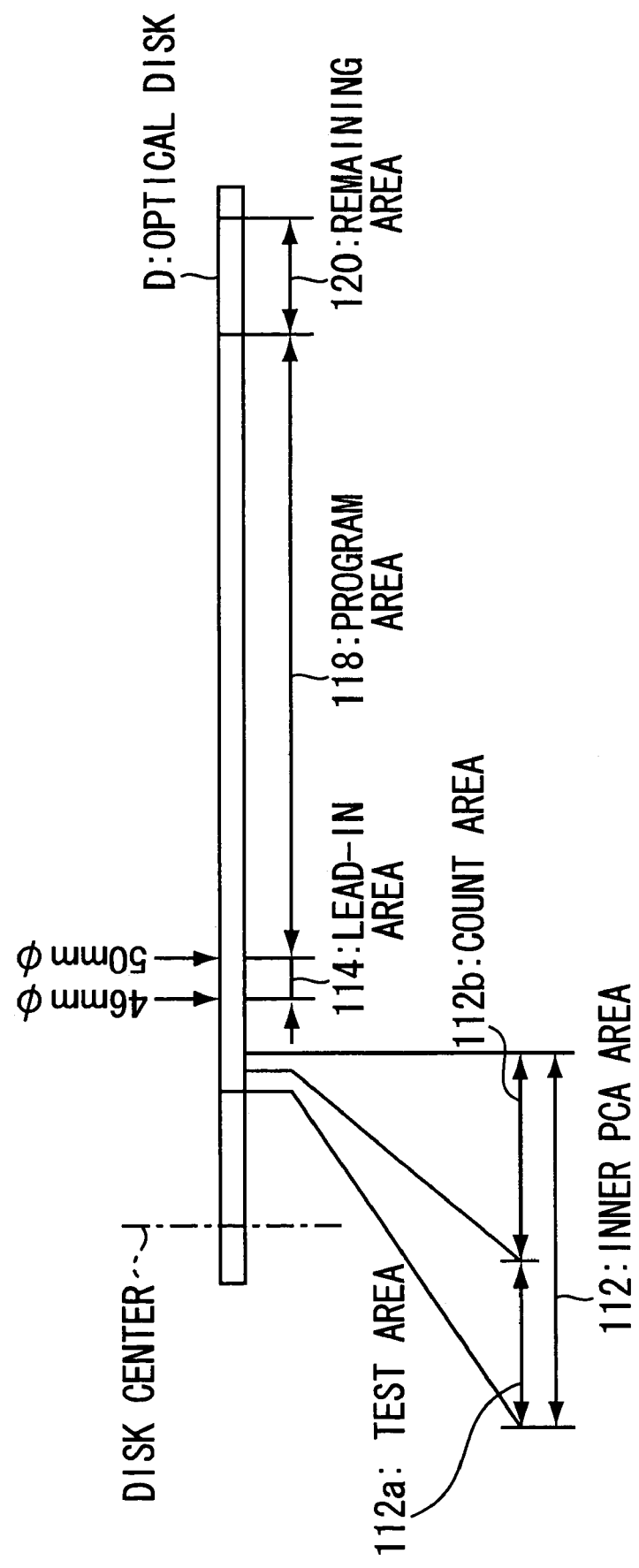
FIG. 7 is a sectional view showing a construction of optical disk areas.

With reference to FIG. 7, the following describes the area for test recording on the optical disk D. FIG. 7 is a sectional view showing a construction of optical disk areas. The optical disk D has an outside diameter of 120 mm. There is provided a lead-in area 114 extending from diameter 46 to 50 mm of the optical disk D. Outside it, there are provided a program area 118 to record data and a remaining area 120. Inside the lead-in area 114, there is provided an inside PCA area 112. The inside PCA area 112 contains a test area 112a and a count area 112b. As mentioned above, the test area 112a is used for test recording prior to actual recording. The test area 112a provides an area capable of test recording more than once. When the test recording terminates, the count area 112b records an EFM signal indicating to which part of the test area 112a the recording is complete. Therefore, when the test recording is performed on the optical disk D next, detecting the EFM signal from the count area 112b makes it possible to determine from which position of the test area 112a the test recording should start. The optical disk recording apparatus 1 according to the embodiment performs test recording on the test area 112a before actual data recording.

Now back to FIG. 6, the storage section 25 temporarily stores reproduction data on the optical disk D output from the decoder 15 and the other data input from the outside of the optical disk recording apparatus 1. During reproduction, the storage section 25 outputs the stored data to a data reproduction section (not shown). When recording data on a recording optical disk, the storage section 25 outputs the stored data to the encoder 17.

The ATIP detection circuit 14 extracts a wobble signal component included in the RF signal supplied from the RF amplifier 12. The wobble signal component contains time information (address information) at each position, identification information (disk ID) for identifying the optical disk, and information indicating a disk type such as dyes used for the disk. The ATIP detection circuit 14 outputs the decoded information to the control section 16. Here, the wobble signal component indicates a wobble frequency of a recording track on a recording optical disk. The time information and the identification information are recorded by FM-modulating the wobble frequency.

The crosstalk detection circuit 22 reproduces data recorded on the optical disk to detect a signal quantity (crosstalk value) of an adjacent track. The crosstalk value depends on a track pitch or a pit width (shape).

During reproduction of the test recording area on the optical disk D, the reproduction signal quality detection circuit 24 calculates a β value and an asymmetry associated with the reproduction signal quality from the RF signal supplied from the RF amplifier 12. A calculation result is output to the control section 16. The β value can be found by $\beta=(a+b)/(a-b)$, where a is the peak level (with sign +) of the EFM-modulated signal waveform and b the bottom level (with sign −).

The servo circuit 13 performs rotation control of the spindle motor 11, and focus control, tracking control, and feed control of the optical pickup 10. The optical disk recording apparatus 1 according to the embodiment can switch between the CAV (Constant Angular Velocity) system and the CLV (Constant Linear Velocity) system during recording. The CAV system drives the optical disk D at a constant angular velocity. The CLV system drives the optical disk D at a constant linear velocity. For this purpose, the servo circuit 13 switches between the CAV system and the CLV system based on a control signal supplied from the control section 16. The servo circuit 13 provides the CAV control so as to establish a match between the number of rotations of the spindle motor 11 detected by the frequency generator 21 and the specified number of rotations. According to the CLV control, the servo circuit 13 controls the spindle motor 11 so that a wobble signal in the RF signal supplied from the RF amplifier 12 reaches a specified velocity ratio.

The encoder 17 EFM-modulates recorded data supplied from the storage section 25 and outputs this data to the strategy circuit 18. The strategy circuit 18 performs time axis correction and the like for the EFM signal supplied from the encoder 17 and outputs this signal to the laser driver 19. The laser driver 19 drives the laser diode of the optical pickup 10 according to a signal modulated by the recorded data supplied from the strategy circuit 18 and under control of the laser power control circuit 20.

The laser power control circuit 20 controls a laser power generated from the laser diode of the optical pickup 10. Specifically, the laser power control circuit 20 controls the laser driver 19 so that the optical pickup 10 can irradiate the laser beam with an optimum laser power. At this time, the control is provided based on a current value supplied from the monitor diode of the optical pickup 10 and based on information indicating a target value of the optimum laser power supplied from the control section 16.

The control section 16 comprises a CPU, ROM, RAM, and the like. In accordance with a program stored in the ROM, the control section 16 controls each part of the optical disk recording apparatus 1. As mentioned above, the control section 16 controls each part of the apparatus so as to perform test recording for a specified area on the optical disk D prior to actual recording. The control section 16 performs a recording rate determination process and the like to find a recordable rate capable of excellent recording with no recording errors. To do this, the control section 16 finds relationship between the reproduction signal quality and apparatus recording parameters (recording conditions) such as the target β value, the write strategy, and the like from a signal obtained during reproduction of the above-mentioned test-recorded area. This process is performed for the optical disk D test-recorded by the optical disk recording apparatus 1 based on the reproduction signal quality such as the β value detected by the reproduction signal quality detection circuit 24.

The storage section 25 stores RID codes for a plurality of optical disk recording apparatuses and recording conditions of each optical disk recording apparatus so that the RID codes and the recording conditions are associated with each other. The operation section 27 is used to manipulate operations for recording data on optical disks. The display section 28 displays contents to be transmitted to a user such as contents of operations performed on the operation section 27.

The following describes operations of overwriting data by the optical disk recording apparatus according to the embodiment of the present invention. When overwriting data on a rewritable optical disk where data is already recorded, the optical disk recording apparatus 1 reads an RID code of the rewritable optical disk D. When the read RID code matches the prestored RID code of its own, the optical disk recording apparatus 1 changes the recording condition, and then overwrites data. More specifically, when reading the RID code, the control section 16 of the optical disk recording apparatus 1 inquires this RID code of the storage section 25. As mentioned above, the storage section 25 stores the information of association between RID codes for a plurality of optical disk recording apparatuses and recording conditions of each optical disk recording apparatus. When requested to inquire into the RID code, the control section 16 collates that RID code with RID codes of the optical disk recording apparatuses. A result of collation may show a match between the current apparatus's RID code and a different optical disk recording apparatus's RID code. In such case, the control section 16 allows the storage section 25 to read stored data for the recording condition associated with the latter RID code, and then performs overwriting under this recording condition.

Orange Book Part 3 specifies that data recorded on a rewritable optical disk must contain an RID code, i.e., a recordable optical disk recording apparatus ID. Reference to this RID code can obtain information about a manufacturer and a model of the optical disk recording apparatus.

The RID code is recorded as main channel information about the PMA (Program Memory Area). When no RID code is obtained from the PMA, the program area is reproduced to obtain the RID code from a frame defined as subcode Q channel mode 3. The RID code can be obtained from main channel information in Run-in and Run-out blocks. Accordingly, it is possible to select where to obtain the RID code depending on recording states of data on optical disks.

The RID code is recorded as 2048-byte main channel data. Of this data, an area between 256 and 1023 bytes is defined as a manufacturer specific code. It is a good practice to use this area to record version information about the firmware (recording control program), information about data recording rates, and other information not defined to be recorded as the RID code. When overwriting the rewritable optical disk, reading the RID code makes it possible to understand more details about the recording condition of the original data. Data can be overwritten by further fine-tuning the recording condition. An area between 1024 and 2047 bytes is reserved for future use. This area can be also used to record information not defined to be recorded as the RID code.

As mentioned above, the optical disk recording apparatus according to the present invention changes the recording condition based on the RID code obtained at the time of overwriting data on the rewritable optical disk. Data can be overwritten under the same condition as for the optical disk recording apparatus that recorded the original data. It is possible to prevent jitter characteristics from being degraded due to an unerased original pit.

It is preferable that the storage section 25 store the recording condition such as information capable of overwriting (erasing and recording) data in the same manner as the original optical disk recording apparatus. Such information includes a write power, an erase power, a bottom power (bias power), $\epsilon$ (erase power/write power), a write strategy, a spot shape, a write power's correction value obtained by the OPC, and the like concerning the laser beam irradiated on rewritable optical disks from the optical disk recording apparatus. In this case, it is preferable that the control section 16 record data by changing the recording condition of overwriting in accordance with the recording condition read from the storage section 25.

The optical disk recording apparatus 1 may read its own RID code at the time of overwriting. In this case, it is preferable to overwrite data under the initial recording condition without changing the recording condition. That is to say, it is preferable to record data under the recording condition specified for the current optical disk recording apparatus. Further, it may be preferable to perform the OPC to find an optimum write power, and then record data.

Figure 8:
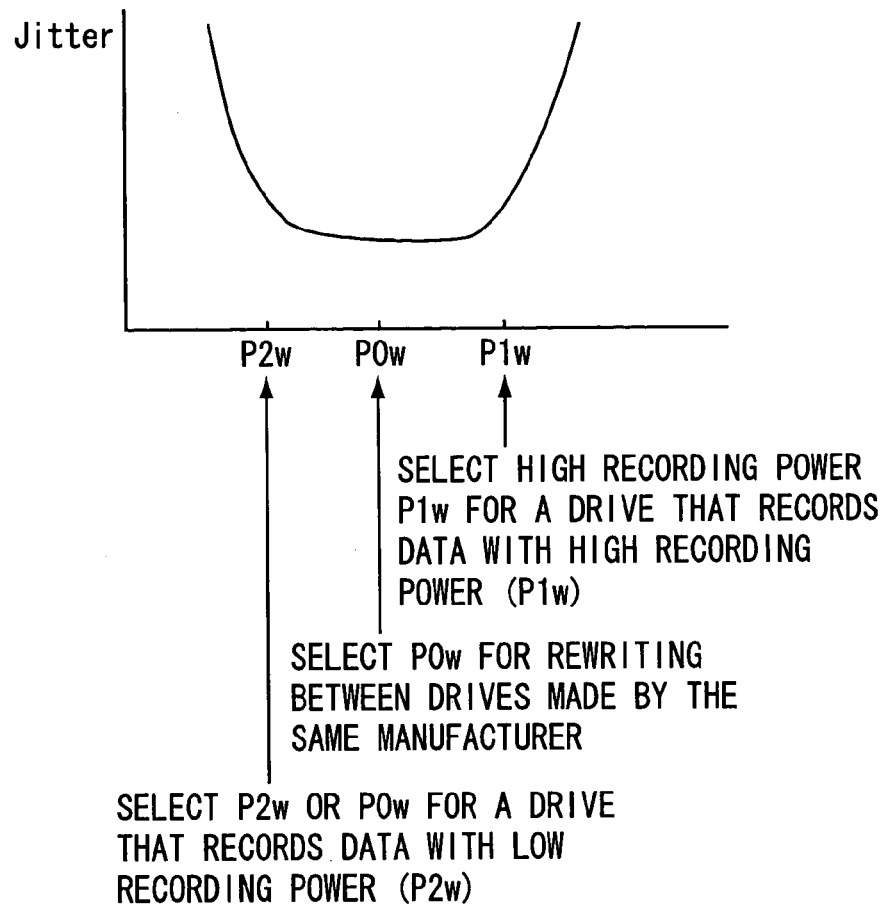
FIGS. 8(A) and 8(B) show the relationship between write power and jitter, and the changes in the jitter when the rewritable optical disk is recorded by different optical disk recording apparatuses.
Figure 8:
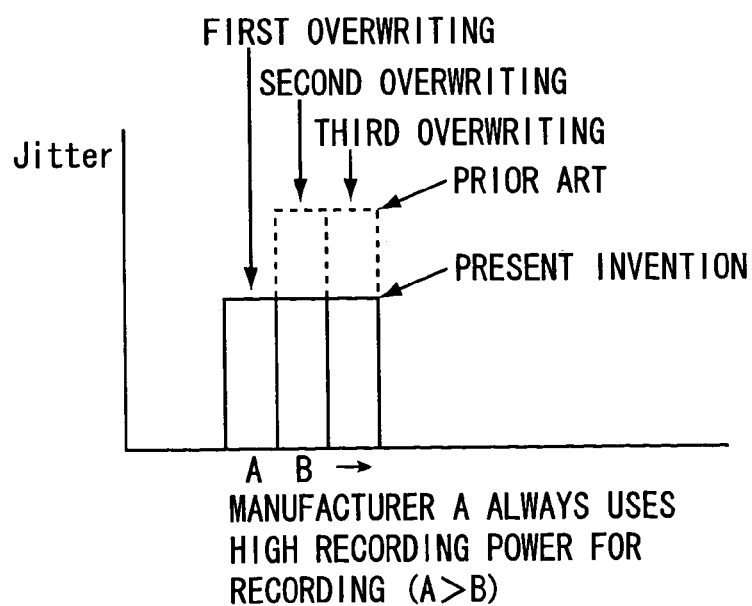

Specifically, it is preferable to set the optical disk recording apparatus 1 as follows. FIG. 8 shows the relationship between write power and jitter as well as changes in the jitter when the rewritable optical disk is recorded on another optical disk recording apparatus. Let us assume that the optical disk recording apparatus 1 is set to write power P0$w$ and erase power P0$e$. For example, FIG. 8(A) shows results of reading the RID code by the optical disk recording apparatus 1 at the time of overwriting. It is assumed that the optical disk recording apparatus 1 that recorded the original data is set to write power P1$w$ and erase power P1$e$. In this case, the recording condition of the optical disk recording apparatus 1 is changed to write power P1$w$ and erase power P1$e$ for overwriting. As another example, it is assumed that the optical disk recording apparatus 1 that recorded the original data is set to write power P2$w$ and erase power P2$e$. In this case, the recording condition of the optical disk recording apparatus 1 is changed to write power P2$w$ and erase power P2$e$ for overwriting. Alternatively, the recording condition of the optical disk recording apparatus 1 is set to its own initial values, i.e., write power P0$w$ and erase power P0$e$ for overwriting. As yet another example, it is assumed that the optical disk recording apparatus 1 reads the RID code of its own at the time of overwriting. In this case, it is preferable to set the values to write power P0$w$ and erase power P0$e$ for overwriting without changing the recording condition.

As mentioned above, the optical disk recording apparatus uses different spot shapes depending on manufacturers. When different spot shapes are used by the optical disk recording apparatus that recorded the original data, changing an irradiation power of the laser beam can provide the same effect as changing a spot shape. For example, let us assume that the current optical disk recording apparatus forms a horizontally long elliptical spot as shown in FIG. 5(B). Further, let us assume that the optical disk recording apparatus that recorded the original data forms a vertically long elliptical spot as shown in FIG. 5(A). In this case, increasing the laser beam's irradiation power to a specified value can form a pit on the rewritable optical disk with almost the same pit width as the original.

Further, as mentioned above, the optical disk recording apparatus may be subject to different recording conditions depending on firmware versions and recording speeds (recording rates). To solve this problem, the optical disk recording apparatus 1 according to the present invention reads the following information when reading the RID code of the rewritable optical disk D for overwriting. That is to say, the optical disk recording apparatus 1 reads the firmware version and the recording rate recorded as the RID code in addition to the information about the manufacturer and the model. Based on these pieces of information, the optical disk recording apparatus 1 can be configured to change the recording condition. In this manner, the recording condition can be changed based on not only the information about the manufacturer and the model, but also the firmware version and the recording rate. The recording condition can be further fine-tuned to set the erase power so as to be able to reliably erase the original data.

As is often the case with conventional optical disk recording apparatuses, value $\epsilon$ (erase power/write power) is fixed corresponding to a recordable optical disk. However, there may be a case where the write power of the optical disk recording apparatus that recorded the original data is weaker than that of the optical disk recording apparatus used for overwriting. In such case, the erase power and the write power must be increased if value $\epsilon$ is fixed. This quickens deterioration of the rewritable optical disk and the laser diode of the optical disk recording apparatus 1. The present invention solves this problem as follows when overwriting on a rewritable optical disk recorded by another optical disk recording apparatus. That is to say, the present invention increases the erase power of the laser beam irradiated onto the rewritable optical disk in accordance with the recording condition of the optical disk recording apparatus that recorded the original data. Further, the write power is set so as to overwrite data by using a value specified as an initial value of the optical disk recording apparatus itself, i.e., changing the ratio of $\epsilon$.

In this manner, it is possible to not only completely erase the original data, but also overwrite new data with the original write power specified for the optical disk recording apparatus. When the rewritable optical disk D is overwritten again on the optical disk recording apparatus 1, the original recording condition need not be changed and can be used as is for overwriting. Therefore, it is possible to restrain further deterioration of the rewritable optical disk D and the laser diode.

The optical disk recording apparatus 1 functions as follows when overwriting data on the rewritable optical disk D where data is already recorded. The optical disk recording apparatus 1 can irradiate the laser beam with the erase power strong enough to completely erase the original data, completely erase the original data recorded on the rewritable optical disk, and record new data. That is to say, the optical disk recording apparatus 1 does not record new data by simultaneously erasing the original data recorded on the optical disk. Instead, the optical disk recording apparatus 1 can irradiate the laser beam with the erase power onto a recordable optical disk area where data is recorded to completely erase the original data, and then irradiate the laser beam with the write power to record new data. Even when data is recorded in this manner, the optical disk recording apparatus can use its own recording condition to record data. When overwriting data on the rewritable optical disk, the optical disk recording apparatus can use its own initial setup value (optimum write power) for the laser power.

Even if another optical disk recording apparatus is used to overwrite data on the rewritable optical disk, the optical disk recording apparatus 1 according to the present invention can stably read data without degrading jitter characteristics as shown in FIG. 8(B).

Figure 9:
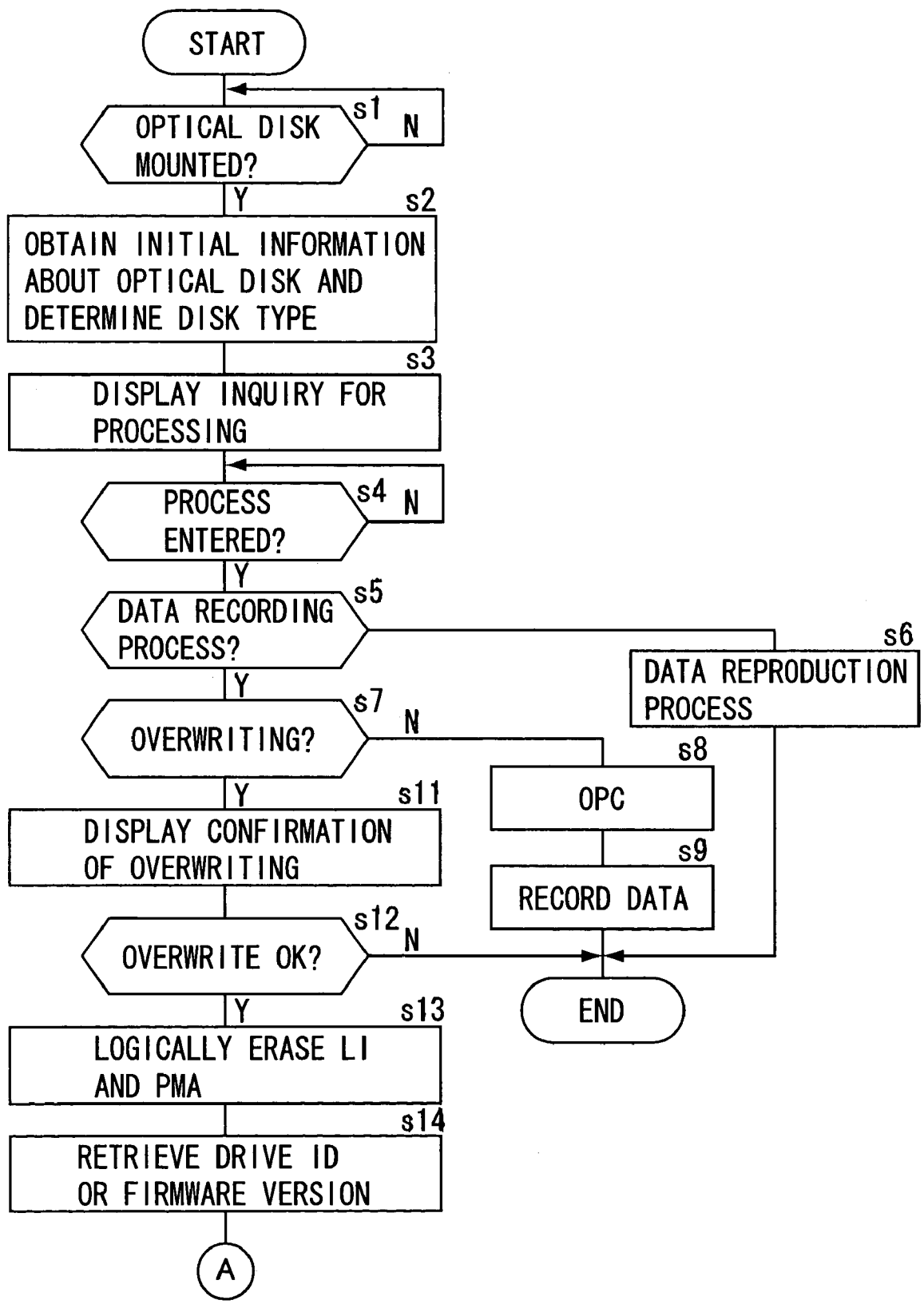
FIG. 9 is a flowchart showing operations of the optical disk recording apparatus according to the embodiment of the present invention.
Figure 10:
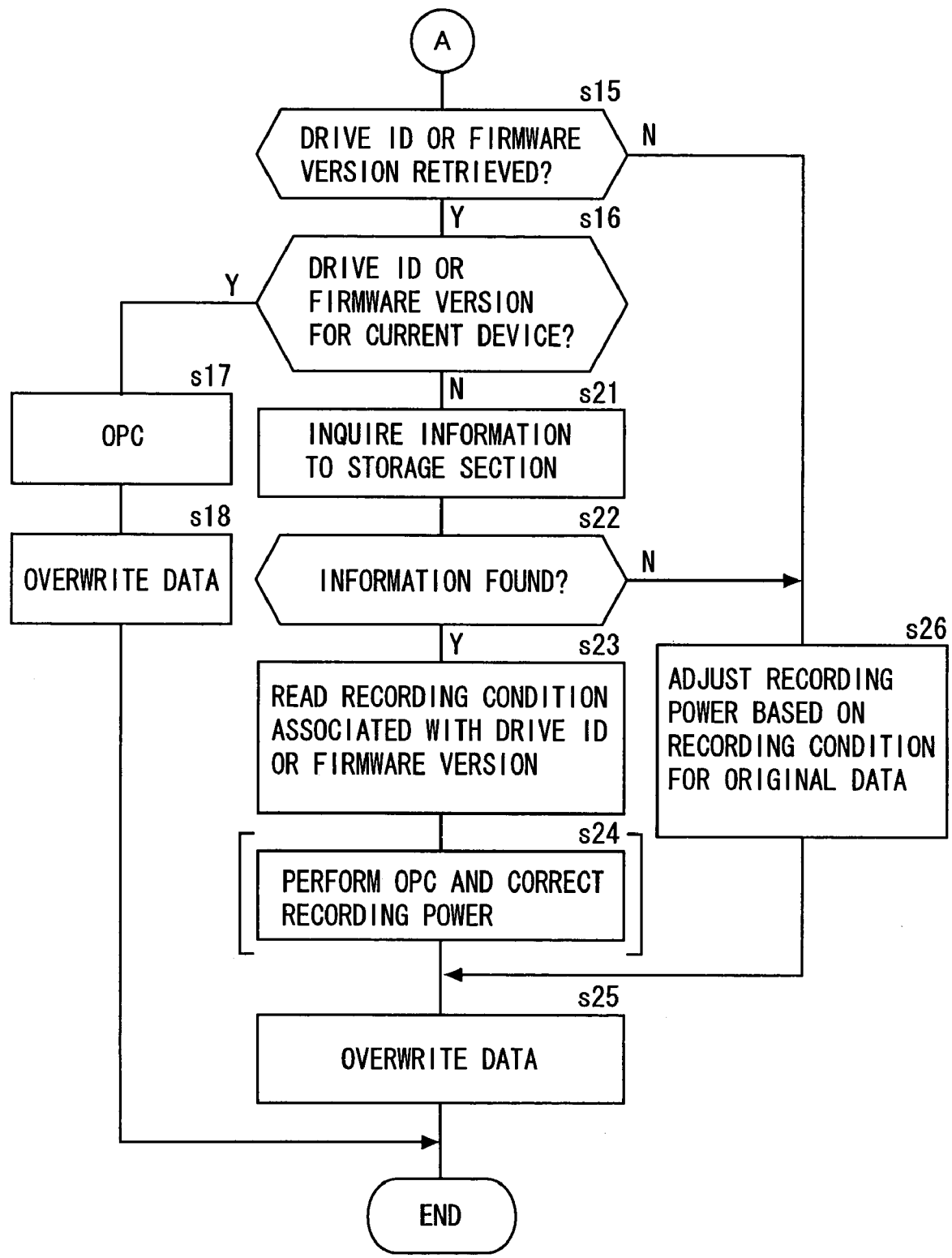
FIG. 10 is a flowchart showing operations of the optical disk recording apparatus according to the embodiment of the present invention.

The following describes operations of the optical disk recording apparatus according to the present invention with reference to flowcharts. FIGS. 9 and 10 are flowcharts showing operations of the optical disk recording apparatus according to the embodiment of the present invention. The following description assumes a case where a user records data on a CD-RW as the rewritable optical disk using the optical disk recording apparatus 1.

When recording data on a CD-RW, the user first mounts the CD-RW on a disk tray of the optical disk recording apparatus as shown in FIG. 9. The control section 16 of the optical disk recording apparatus 1 detects that the CD-RW is mounted (s1). After chucking the CD-RW, the control section 16 moves the optical pickup to a specified position and irradiates the laser beam to obtain initial information (s2). Specifically, the control section 16 first determines a reflectance of the laser beam to identify a recordable optical disk type. When the optical disk reflectance is low, it can be determined that a rewritable optical disk (CD-RW) is used. When the optical disk reflectance is high, it can be determined that a write-once-read-many optical disk (CD-R) or a readable (non-recordable) optical disk (CD-ROM) is used. Further, the control section 16 detects whether or not there is a wobble component in the lead-in area of the optical disk mounted on the optical disk recording apparatus 1. When the wobble information is found, the control section 16 detects the ATIP information. When the ATIP information can be detected, the control section 16 determines that the mounted disk is a rewritable optical disk or a write-once-read-many optical disk. The ATIP information includes a disk ID (maker code) and STLI (Start Time of Lead-In Area) equivalent to the maker code and the disk code. These pieces of information are used for various control operations. In this manner, the control section 16 uses the reflectance and the ATIP information to determine whether the optical disk is rewritable, write-once-read-many, or readable. Further, the ATIP information is used to obtain a recordable optical disk ID.

Then, the control section 16 uses the display section 28 to display the contents of inquiry into what process should be performed for the CD-RW the user mounted (s3). In response to this display, the user specifies a process to be performed for the mounted CD-RW. The control section 16 detects an input from the operation section 27 (s4). When data reproduction is specified (s5), the control section 16 reproduces data (s6). When the data reproduction is complete, the control section 16 terminates the process.

When data recording is selected (s5), the control section 16 determines whether the recording operation is initial recording or overwriting (s7). Specifically, the control section 16 determines whether or not an EFM signal is present in the lead-in area and the PMA. When the EFM signal is not recorded in both areas or in the lead-in area, the initial recording is assumed. When the CD-RW is a blank disk or is being recorded, the control section 16 is to record data of the optical disk D in an unrecorded area for the first time. The control section 16 performs OPC in the PCA to determine an optimum write power (s8). The control section 16 records data on the CD-RW normally or in a write-once-read-many fashion, and then terminates the process (s9).

When the EFM signal is recorded in the lead-in area and the PMA on the CD-RW at step s7, the control section 16 determines that an overwrite operation is to be performed. The control section 16 inquires of the user whether or not to perform the overwrite operation (s11). When the user inputs an intention of not overwriting (s12), the control section 16 terminates the process.

When the user inputs an intention of overwriting at step s12, the control section 16 first logically erases the PMA and the lead-in area, i.e., by overwriting digital zeros (s13). This erases the TOC information and makes the disk available as a blank disk. The lead-in area also records the logical-zero signal. When decoding the EFM signal, detecting the logical-zero signal can determine the overwriting.

The control section 16 then retrieves the drive ID and the firmware version information about the optical disk recording apparatus that recorded data on the CD-RW (s14). The drive ID (RID code) is recorded as main channel information in the PMA. The control section 16 reads the firmware (recording control program) version information from the manufacturer specific code recorded between 256 and 1023 bytes in the 2048-byte main channel data recorded as the RID code as mentioned above.

When the RID code cannot be obtained from the PMA at step s14, reproducing the program area can obtain the RID code from the frame defined as subcode Q channel mode 3. The RID code can be also obtained from the main channel information in the Run-in and Run-out blocks. Consequently, it is possible to select where to obtain the RID code according to states of recording data on the optical disk.

As shown in FIG. 10, the control section 16 of the optical disk recording apparatus 1 may succeed in obtaining the drive ID and the firmware version information (s15). In this case, the control section 16 confirms whether or not the drive ID and the firmware version information correspond to those of the current apparatus (s16). When the drive ID and the firmware version information correspond to those of the current apparatus, the control section 16 performs the OPC to find an optimum write power (s17), overwrites data (s18), and then terminates the process.

When the drive ID and the firmware version information are found to be different from those of the current apparatus at step s16, the control section 16 references the information stored in the storage section 25 (s21). As mentioned above, the storage section 25 of the optical disk recording apparatus 1 stores the recording conditions in association with drive IDs and firmware version information about a plurality of optical disk recording apparatuses. The stored recording condition contains the firmware version information associated with at least one of conditions such as the write power value, the erase power value, the bottom power value, and the write strategy.

The storage section 25 may store the drive ID and the firmware version information about the optical disk recording apparatus (s22). In this case, the control section 16 reads the recording condition for overwriting stored in association with the drive ID and the firmware version information (s23).

Based on this recording condition, the control section 16 overwrites data (s25). The control section 16 then terminates the process.

The write power correction information may be provided as the recording condition for overwriting stored in association with the drive ID and the firmware version information. In this case, the control section 16 reads this information (s23), and then performs the OPC in the PMA to obtain an optimum write power. The control section 16 corrects the write power and value ε (erase power/write power) based on the write power correction information (s24). The control section 16 overwrites data (s25). The control section 16 then terminates the process.

At step s15, the control section 16 may not be able to detect the drive ID and the firmware version information because these pieces of information are not recorded on the CD-RW. At step s22, the storage section 25 may not store the drive ID and the firmware version information. In such case, the control section 16 estimates and adjusts the write power and the erase power according to the state of the original data recorded on the CD-RW (s26). For example, the control section 16 reproduces the original data recorded on the CD-RW and adjusts the write power and the erase power according to a crosstalk signal quantity detected by the crosstalk detection circuit 22. The control section 16 then performs the process at step s25.

Instead of the above-mentioned process at step s26, it may be preferable to set a maximum erase power capable of erasing data recorded on the rewritable optical disk and set an optimum write power for the rewritable optical disk. The maximum erase power for the rewritable optical disk depends on optical disks. However, the maximum erase power can be specified based on the optical disk's initial information read at step s2. This makes it possible to reliably erase pits for the original data even if a different recording condition is used for the rewritable optical disk on the optical disk recording apparatus.

While there has been described the embodiment of using the CD-RW as a recording medium, the present invention is also applicable to DVD-RW and DVD+RW. A DVD-compliant recording medium is provided with an area called RMA to record information such as a drive ID, a disk ID, and a write power. Effects similar to those for the CD-RW are available by obtaining necessary information from the RMA area.

Data may be overwritten with a write power higher than that set for the current optical disk recording apparatus. In such case, it is a good practice to record the write power information as the RID code for the CD-RW or record the same information in the RMA area of the DVD-RW and DVD+RW. Reading this information enables data to be overwritten by using the recording condition free from an influence of the original data.

The present invention provides the following effects.

The original data can be completely erased by overwriting data under the same recording condition as for the optical disk recording apparatus that has recorded the original data. Data can be overwritten under a proper recording condition without degrading jitter characteristics.

It is possible to further fine-tune the recording condition for new data to be overwritten, enabling the original data to be erased completely. An error rate for new data can be decreased.

There is no need for changing the recording condition such as increasing the write power according to the original data. It is possible to extend the life of the laser diode and the rewritable optical disk. When an overwrite is performed again on the current optical disk recording apparatus, its own recording condition can be used for overwriting without changing the erase power or the write power.

It is possible to further fine-tune the recording condition for new data to be overwritten. The original data can be completely erased to overwrite new data.

The recording condition for data to be overwritten is adjusted based on the recording condition according to the version information of the recording control program. The original data can be reliably erased for overwriting different data.

When data is overwritten on a recordable optical disk, there is detected a match with the recorder identification information contained in the optical disk. In this case, an overwrite is performed using at least one of the write power, the erase power, and the bottom power associated with the matching recorder identification information. An appropriate recording condition can be used for the overwrite.

It is determined whether data is recorded initially or is overwritten on a recordable optical disk. Data is recorded under the recording condition according to this recording state. Data can be recorded on the optical disk under an optimum recording condition.

When data is overwritten, the OPC is performed to determine an optimum write power. The recorder identification information is then detected. Based on this recorder identification information, the write power or the erase power is corrected. Accordingly, new data can be overwritten by reliably erasing data already recorded on the optical disk.

What is claimed is:

1. A method of recording data on a recordable optical disk using a laser beam of a present recording apparatus under a desired recording condition, the method comprising:

detecting identification information which is reserved in the optical disk and is representative of a type of a recording apparatus which previously recorded data on the optical disk;

comparing the detected identification information with a plurality of identification information, which are stored in the present recording apparatus and correspond to various types of recording apparatuses;

determining, as results of the comparing, whether the detected identification information matches one of the stored identification information;

retrieving, after a matching identification information is found, a recording condition associated with the matching identification information; and recording the data on the optical disk using the retrieved recording condition.

2. The method according to claim 1, wherein the step of detecting includes detecting rate information representative of a rate at which old data was previously recorded on the optical disk by a recording apparatus of the type corresponding to the matching identification information, and the method includes the step of erasing the recorded old data and the recording of the data is performed in conformity with the detected rate information.

3. A method of recording new data using a present recording apparatus under a desired recording condition by irradiating a laser beam on a recordable optical disk which has been recorded with old data by a previous recording apparatus, the method comprising the steps of:

detecting identification information which is reserved in the optical disk and is representative of at least a manufacturer or model type of the previous recording apparatus;

comparing the detected identification information with a plurality of stored identification information which correspond to the present recording apparatus type and other recording apparatus types;

determining, as results of the comparing, whether the detected identification information matches one of the stored identification information;

retrieving, after a matching identification information is found, a recording condition associated with the matching identification information; and recording the new data on the optical disk using the retrieved recording condition which indicates either a power of the laser beam or a strategy of irradiating the laser beam, the power indicating at least one of an erase power for erasing the old data from the optical disk, a write power for recording the new data on the optical disk or a bottom power of the laser beam.

4. The method according to claim 3, wherein the step of detecting includes detecting rate information representative of a rate at which the old data was recorded on the optical disk by the previous recording apparatus, and the method includes the step of erasing the old data in conformity with the detected rate information prior to recording the new data.

5. A method of recording new data using a laser beam of a present recording apparatus under a desired recording condition by irradiating a laser beam on a recordable optical disk of a rewritable type which has been recorded with old data by a previous recording apparatus, the method comprising the steps of:

detecting identification information which is reserved in the optical disk and is representative of at least a manufacturer or model type of the previous recording apparatus;

comparing the detected identification information with a plurality of stored identification information which correspond to the present recording apparatus type and other recording apparatus types;

determining, as results of the comparing, whether the detected identification information matches one of the stored identification information;

retrieving, after a matching identification information is found, a recording condition associated with the matching identification information; and recording the new data on the optical disk using both the retrieved recording condition and a current recording condition set for the present recording apparatus such that the retrieved recording condition is used to control an erase power of the laser beam for erasing the old data from the optical disk while the current recording condition is used to optimize a write power of the laser beam for recording the new data over the erased old data.

6. The method according to claim 5, wherein the step of detecting includes detecting rate information representative of a rate at which the old data was recorded on the optical disk by the previous recording apparatus, and the method includes the step of erasing the old data in conformity with the detected rate information prior to recording the new data.

7. A method of recording data using a recording apparatus with a desired recording condition on a recordable optical disk which has been recorded with old data by another recording apparatus installed with a version of a recording control program for controlling the recording of the old data, the method comprising the steps of:

detecting version information which is reserved in the optical disk and is representative of the version of the recording control program installed in said another recording apparatus;

comparing the detected version information with a plurality of stored version information which correspond to different versions of the recording control program;

determining, as results of the comparing, whether the detected version information matches one of the stored version information;

retrieving, after a matching version information is found, a recording condition associated with the matching version information; and recording the data on the optical disk using the retrieved recording condition.

8. A method of performing a session of recording new data using a recording apparatus under a desired recording condition by irradiating a laser beam onto a recordable optical disk which has a filled track recorded with old data by another recording apparatus and a vacant track recorded with no data, the method comprising the steps of:

discriminating whether the session is an initial writing session for recording the new data into the vacant track or an overwriting session for recording the new data over the filled track; and performing either of the initial writing session or the overwriting session based on results of the step of discriminating, wherein the initial writing session is performed by the steps of: conducting an OPC operation to determine an optimal write power of the laser beam; and using the determined optimal write power of the laser beam to record the new data onto the vacant track, and wherein the overwriting session is performed by the steps of: detecting identification information which is reserved in the optical disk for identifying at least a manufacturer or a model type of said another recording apparatus; comparing the detected identification information with a plurality of stored identification information which correspond to various types of recording apparatuses so as to determine if the detected identification information matches with one of the stored identification information; retrieving a recording condition associated with the matching identification information; recording the new data into the filled track of the optical disk using the retrieved recording condition which indicates at least one of an erase power for erasing the old data from the filled track, a write power for writing the new data over the erased old data or a bottom power of the laser beam; otherwise conducting the OPC operation to determine an optimal write power of the laser beam when the detected identification information does not match with any one of the stored identification information; and recording the new data into the filled track using the determined optimal write power of the laser beam.

9. A method of performing a session of recording new data using a recording apparatus under a desired recording condition by irradiating a laser beam onto a recordable optical disk which has a filled track recorded with old data by another recording apparatus and a vacant track recorded with no data, the method comprising the steps of:

discriminating whether the session is an initial writing session for recording the new data into the vacant track or an overwriting session for recording the new data over the filled track; and performing either of the initial writing session or the overwriting session based on results of the step of discriminating, wherein the initial writing session is performed by the steps of: conducting an OPC operation to determine an optimal write power of the laser beam; and using the determined optimal write power of the laser beam to record the new data onto the vacant track, and wherein the overwriting session is performed by the steps of: detecting identification information which is reserved in the optical disk for identifying at least a manufacturer or a model type of said another recording apparatus; comparing the detected identification information with a plurality of stored identification information which correspond to various types of recording apparatuses so as to determine if the detected identification information matches with one of the stored identification information; retrieving a recording condition associated with the matching identification information; recording the new data into the filled track of the optical disk using the retrieved recording condition which indicates either a power of the laser beam or a strategy of irradiating the laser beam, the power indicating at least one of an erase power for erasing the old data from the filled track, a write power for recording the new data over the erased old data or a bottom power of the laser beam; otherwise conducting the OPC operation to determine an optimal write power of the laser beam when the detected identification information does not match with any one of the stored identification information; and recording the new data into the filled track using the determined optimal write power of the laser beam.

10. A method of performing a session of recording new data using a recording apparatus under a desired recording condition by irradiating a laser beam onto a recordable optical disk which has a filled track recorded with old data by another recording apparatus and a vacant track recorded with no data, the method comprising the steps of:

discriminating whether the session is an initial writing session for recording the new data into the vacant track or an overwriting session for recording the new data over the filled track; and performing either of the initial writing session or the overwriting session based on results of the step of discriminating, wherein the initial writing session is performed by the steps of: conducting an OPC operation to determine an optimal write power of the laser beam; and using the determined optimal write power of the laser beam to record the new data onto the vacant track, and wherein the overwriting session is performed by the steps of: conducting the OPC operation to determine an optimal write power of the laser beam; detecting identification information which is reserved in the optical disk and is representative of at least a manufacturer or a model type of said another recording apparatus; comparing the detected identification information with a plurality of stored identification information which correspond to various types of recording apparatuses so as to determine if the detected identification information matches with one of the stored identification information; retrieving correction information associated with the matching identification information; correcting the determined optimal write power of the laser beam according to the retrieved correction information; and using the corrected optimal write power of the laser beam to record the new data onto the filled track.

11. The method according to claim 10, further comprising the steps of determining an erase power of the laser beam based on the determined optimal write power, correcting the determined erase power of the laser beam according to the retrieved correction information, and using the corrected erase power of the laser beam for erasing the old data from the filled track.

12. An optical recording apparatus for recording data on a recordable optical disk under a desired recording condition, comprising:

a detecting section that detects identification information which is reserved in the optical disk for identifying a type of another optical recording apparatus;

a storage section that stores a plurality of identification information in correspondence to various types of other optical recording apparatuses, and stores a plurality of recording conditions in association with the plurality of the identification information, respectively;

a comparing section that compares the detected identification information with the plurality of the stored identification information so as to determine whether the detected identification information matches with one of the stored identification information; and a recording section that operates upon the determining of matching for retrieving a recording condition associated with the matching identification information, and that performs the recording of the data on the optical disk using the retrieved recording condition.

13. The optical recording apparatus according to claim 12, wherein the detecting section further detects additional information including at least one of program version information, disk identification information or recording rate information from the optical disk of a rewritable type which has been recorded with old data by another optical recording apparatus installed with a control program for recording the old data, the program version information indicating the version of the installed control program, the disk identification information identifying the optical disk, and the recording rate information indicating a recording rate of the old data, and wherein the recording section performs the recording of the data so as to write the data over the old data in conformity with the detected additional information.

14. A computer readable medium encoded with a program for use in an optical recording apparatus having a CPU for recording data on a recordable optical disk under a desired recording condition, the program being executable by the CPU for causing the optical recording apparatus to perform a process comprising the steps of:

detecting identification information which is reserved in the optical disk and is representative of a type of another optical recording apparatus;

providing a plurality of identification information in correspondence to various types of other optical recording apparatuses, and a plurality of recording conditions associated with the plurality of the identification information;

comparing the detected identification information with the plurality of the provided identification information so as to determine whether the detected identification information matches with one of the provided identification information;

retrieving, upon the determining of matching, a recording condition associated with the matching identification information; and performing the recording of the data on the optical disk with use of the retrieved recording condition.

15. The computer readable medium according to claim 14, wherein the detecting step includes detecting at least one of version information, disk identification information or recording rate information from the optical disk of a rewritable type which has been recorded with old data by another optical recording apparatus installed with a firmware for operating said another optical recording apparatus, the version information indicating a version of the firmware, the disk identification information identifying the optical disk, and the recording rate information indicating a recording rate of the old data, and wherein the performing step writes the data for recording over the old data in conformity with the detected additional information.

16. A method of recording data on a recordable optical disk by use of a present recording apparatus under a desired present recording condition having a laser power, the method comprising:

detecting identification information which is reserved in the optical disk and is representative of a previous recording condition of a previous recording apparatus; and recording data on the optical disk by the present recording apparatus with use of the present recording condition, which has the same laser power as or higher laser power than the detected previous recording condition of the previous recording apparatus, without degrading jitter characteristics.

17. A recording apparatus for recording data on a recordable optical disk under a desired present recording condition having a laser power, the apparatus comprising:

a detecting device that detects identification information which is reserved in the optical disk and is representative of a recording condition of a previous recording apparatus; and a recording device that records data on the optical disk with use of the present recording condition, which has the same laser power as or higher laser power than the detected previous recording condition of the previous recording apparatus, without degrading jitter characteristics.

* * * * *